(12) United States Patent
Hashimoto

(10) Patent No.: US 7,975,289 B2
(45) Date of Patent: Jul. 5, 2011

(54) PROGRAM, CLIENT AUTHENTICATION REQUESTING METHOD, SERVER AUTHENTICATION REQUEST PROCESSING METHOD, CLIENT AND SERVER

(75) Inventor: Koji Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 966 days.

(21) Appl. No.: 11/150,977

(22) Filed: Jun. 13, 2005

(65) Prior Publication Data

US 2006/0218337 A1    Sep. 28, 2006

(30) Foreign Application Priority Data

Mar. 24, 2005 (JP) .................................. 2005-086253

(51) Int. Cl.
*G06F 7/04* (2006.01)
(52) U.S. Cl. ............. 726/4; 726/2; 726/3; 726/5; 726/6; 726/26; 726/27; 726/28; 726/29; 726/30; 713/168; 711/100; 709/203; 709/225; 709/227; 709/229; 455/411
(58) Field of Classification Search .................. 711/100; 713/168; 726/1, 2–6, 26–30; 709/225, 227, 709/229, 203; 455/411
See application file for complete search history.

(56) References Cited

U.S. PATENT DOCUMENTS

| | | | | | |
|---|---|---|---|---|---|
| 5,832,210 | A | * | 11/1998 | Akiyama et al. | 713/168 |
| 6,049,825 | A | * | 4/2000 | Yamamoto | 709/221 |
| 6,115,376 | A | * | 9/2000 | Sherer et al. | 370/389 |
| 6,393,484 | B1 | * | 5/2002 | Massarani | 709/227 |
| 6,493,748 | B1 | * | 12/2002 | Nakayama et al. | 709/218 |
| 6,745,333 | B1 | * | 6/2004 | Thomsen | 726/23 |
| 7,124,197 | B2 | * | 10/2006 | Ocepek et al. | 709/232 |
| 7,188,245 | B2 | * | 3/2007 | Isozaki et al. | 713/171 |
| 7,269,418 | B2 | * | 9/2007 | Kayashima et al. | 455/432.2 |
| 7,272,846 | B2 | * | 9/2007 | Williams et al. | 725/111 |
| 7,352,756 | B2 | * | 4/2008 | Kimura et al. | 370/401 |
| 7,367,046 | B1 | * | 4/2008 | Sukiman et al. | 726/2 |
| 7,386,876 | B2 | * | 6/2008 | Kim | 726/3 |
| 7,492,772 | B2 | * | 2/2009 | Nam et al. | 370/395.54 |

(Continued)

FOREIGN PATENT DOCUMENTS

JP    2000-105745    4/2000

(Continued)

OTHER PUBLICATIONS

Japanese Office Action mailed Oct. 2, 2010 for Application No. JP 2005-086253 (with English language translation).

*Primary Examiner* — Nasser Moazzami
*Assistant Examiner* — Shanto M Abedin
(74) *Attorney, Agent, or Firm* — Greer, Burns & Crain, Ltd.

(57) ABSTRACT

The client requests authentication by transmitting the authentication information entered by the user, the MAC address of the network adapter, and the address change information as to whether or not the MAC address has been changed. When the authentication information and the MAC address are in agreement with the details of registration, and if a change in the MAC address is recognized from the address change information, the server regards the authentication as being a failure and issues an access refusal, thus completing the processing. If a change in the MAC address is recognized, the fact may be notified to the manager to issue an access permit or an access refusal in accordance with the manager's instruction.

3 Claims, 14 Drawing Sheets

U.S. PATENT DOCUMENTS

| | | | |
|---|---|---|---|
| 7,526,538 B2 * | 4/2009 | Wilson | 709/220 |
| 7,546,358 B1 * | 6/2009 | Ochiai | 709/228 |
| 7,580,407 B2 * | 8/2009 | Shimada | 370/389 |
| 7,610,380 B2 * | 10/2009 | Igarashi et al. | 709/226 |
| 7,711,819 B2 * | 5/2010 | Ono et al. | 709/226 |
| 7,733,906 B2 * | 6/2010 | Raman et al. | 370/469 |
| 2002/0026529 A1 * | 2/2002 | Sugahara | 709/246 |
| 2002/0071417 A1 * | 6/2002 | Nakatsugawa et al. | 370/338 |
| 2002/0107961 A1 * | 8/2002 | Kinoshita | 709/225 |
| 2003/0028808 A1 * | 2/2003 | Kameda | 713/201 |
| 2003/0040932 A1 * | 2/2003 | Sato | 705/1 |
| 2003/0149776 A1 * | 8/2003 | Tsunezumi | 709/228 |
| 2003/0167411 A1 * | 9/2003 | Maekawa | 713/201 |
| 2004/0152439 A1 * | 8/2004 | Kimura et al. | 455/403 |
| 2004/0168062 A1 * | 8/2004 | Isozaki et al. | 713/171 |
| 2004/0213172 A1 * | 10/2004 | Myers et al. | 370/313 |
| 2004/0213237 A1 * | 10/2004 | Yasue et al. | 370/392 |
| 2005/0022024 A1 * | 1/2005 | Hashimoto | 713/201 |
| 2005/0055547 A1 * | 3/2005 | Kawamura | 713/155 |
| 2005/0169288 A1 * | 8/2005 | Kamiwada et al. | 370/401 |
| 2005/0197116 A1 * | 9/2005 | Kayashima et al. | 455/432.2 |
| 2005/0198495 A1 * | 9/2005 | De Jaegher et al. | 713/155 |
| 2006/0089987 A1 * | 4/2006 | Igarashi et al. | 709/225 |
| 2006/0114863 A1 * | 6/2006 | Sanzgiri et al. | 370/338 |
| 2006/0126622 A1 * | 6/2006 | Park et al. | 370/389 |
| 2006/0140163 A1 * | 6/2006 | He et al. | 370/338 |

FOREIGN PATENT DOCUMENTS

| | | |
|---|---|---|
| JP | 2002-222172 | 8/2002 |
| JP | 2003-030144 | 1/2003 |
| JP | 2003-162507 | 6/2003 |
| JP | 2004-343397 | 12/2004 |

* cited by examiner

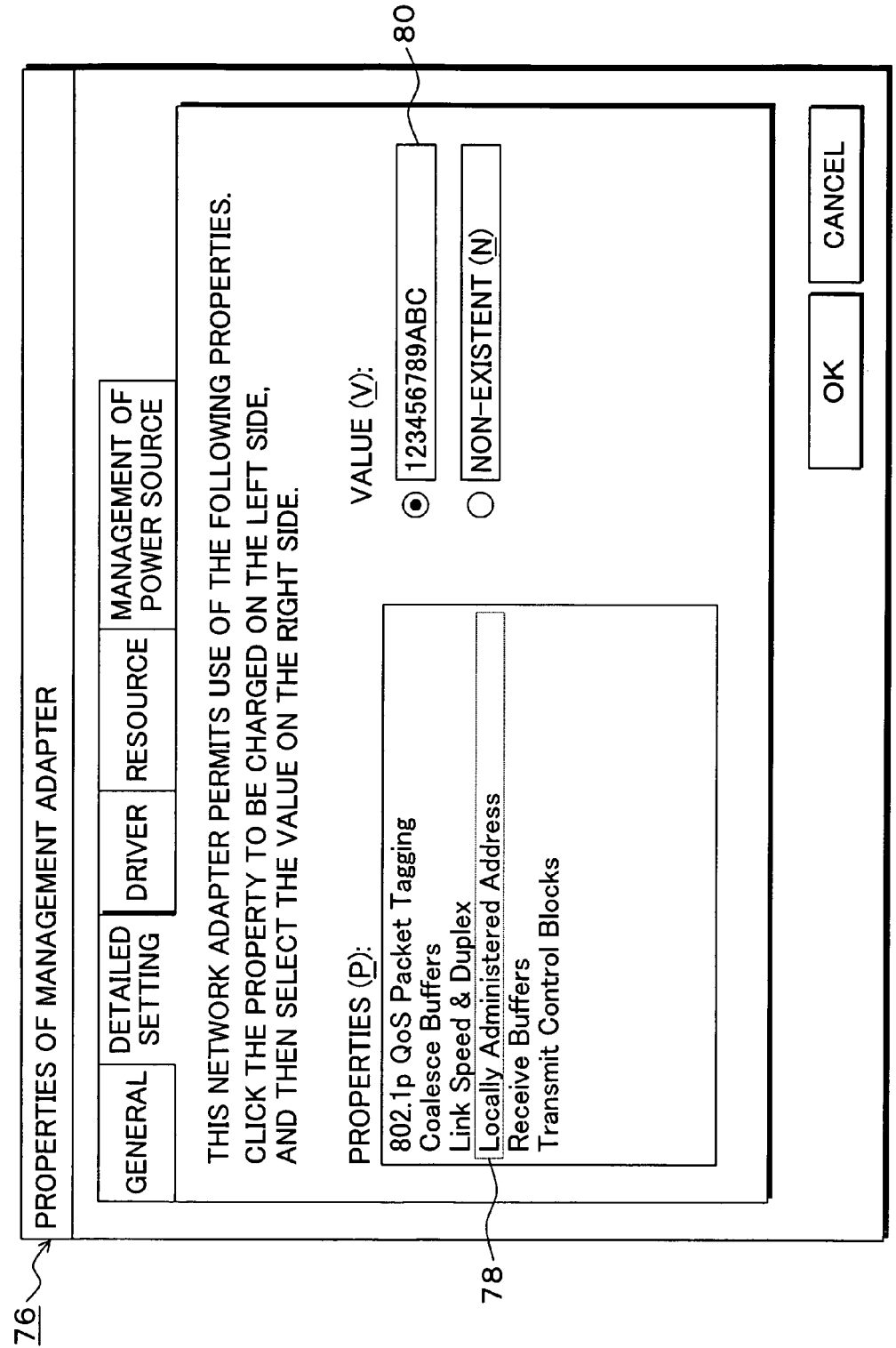

FIG. 4B

| NAME | KIND | DATA |
|---|---|---|
| ☐ (STANDARD) | REG_SZ | *** |
| ☐ Adaptive_IFS | REG_SZ | *** |
| ☐ BusType | REG_SZ | *** |
| ☐ Characteristics | REG_DWORD | *** |
| ☐ Coalesce | REG_SZ | *** |
| ☐ ComponentId | REG_SZ | *** |
| ☐ CPUSaver | REG_SZ | * |
| ☐ CryptoOnly | REG_SZ | * |
| ☐ DriveDate | REG_SZ | * |
| ☐ DriverDateData | REG_BINARY | * |
| ☐ DriverDesc | REG_SZ | * |
| ☐ DriverVersion | REG_SZ | * |
| ☐ InfPath | REG_SZ | * |
| ☐ InfSection | REG_SZ | * |
| ☐ MatchingDeviceId | REG_SZ | * |
| ☐ MWIEnable | REG_SZ | * |
| ☐ NetCfgInstanceId | REG_SZ | *** |
| ☐ NumCoalesce | REG_SZ | * |
| ☐ NumRfd | REG_SZ | * |
| ☐ NumTcb | REG_SZ | * |
| ☐ PacketTagging | REG_SZ | * |
| ☐ PcNic | REG_SZ | * |
| ☐ ProviderName | REG_SZ | * |
| ☐ SpeedDuplex | REG_SZ | ** |
| ☐ UcodeSW | REG_SZ | ** |

84 (brace indicating the table area)

FIG. 5B

| NAME | KIND | DATA |
|---|---|---|
| ☐ (STANDARD) | REG_SZ | *** |
| ☐ Adaptive_IFS | REG_SZ | *** |
| ☐ BusType | REG_SZ | *** |
| ☐ Characteristics | REG_DWORD | *** |
| ☐ Coalesce | REG_SZ | *** |
| ☐ ComponentId | REG_SZ | *** |
| ☐ CPUSaver | REG_SZ | * |
| ☐ CryptoOnly | REG_SZ | * |
| ☐ DriveDate | REG_SZ | * |
| ☐ DriverDateData | REG_BINARY | * |
| ☐ DriverDesc | REG_SZ | * |
| ☐ DriverVersion | REG_SZ | * |
| ☐ InfPath | REG_SZ | * |
| ☐ InfSection | REG_SZ | * |
| ☐ MatchingDeviceId | REG_SZ | * |
| ☐ MWIEnable | REG_SZ | * |
| ☐ NetCfgInstanceId | REG_SZ | *** |
| ☐ NetworkAddress | REG_SZ | 123456789ABC |
| ☐ NumCoalesce | REG_SZ | * |
| ☐ NumRfd | REG_SZ | * |
| ☐ NumTcb | REG_SZ | * |
| ☐ PacketTagging | REG_SZ | * |
| ☐ PcNic | REG_SZ | * |
| ☐ ProviderName | REG_SZ | * |
| ☐ SpeedDuplex | REG_SZ | ** |
| ☐ UcodeSW | REG_SZ | ** |

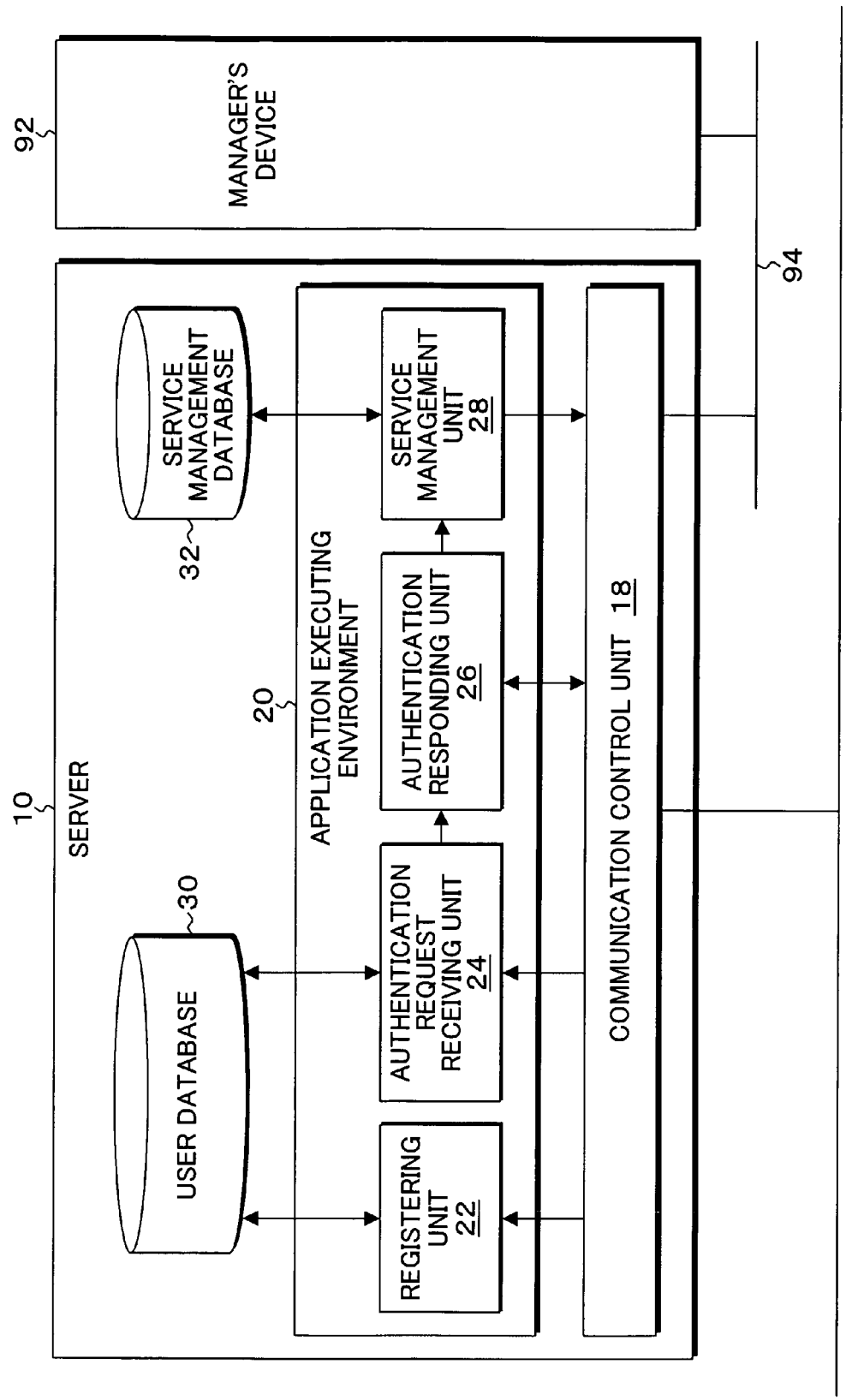

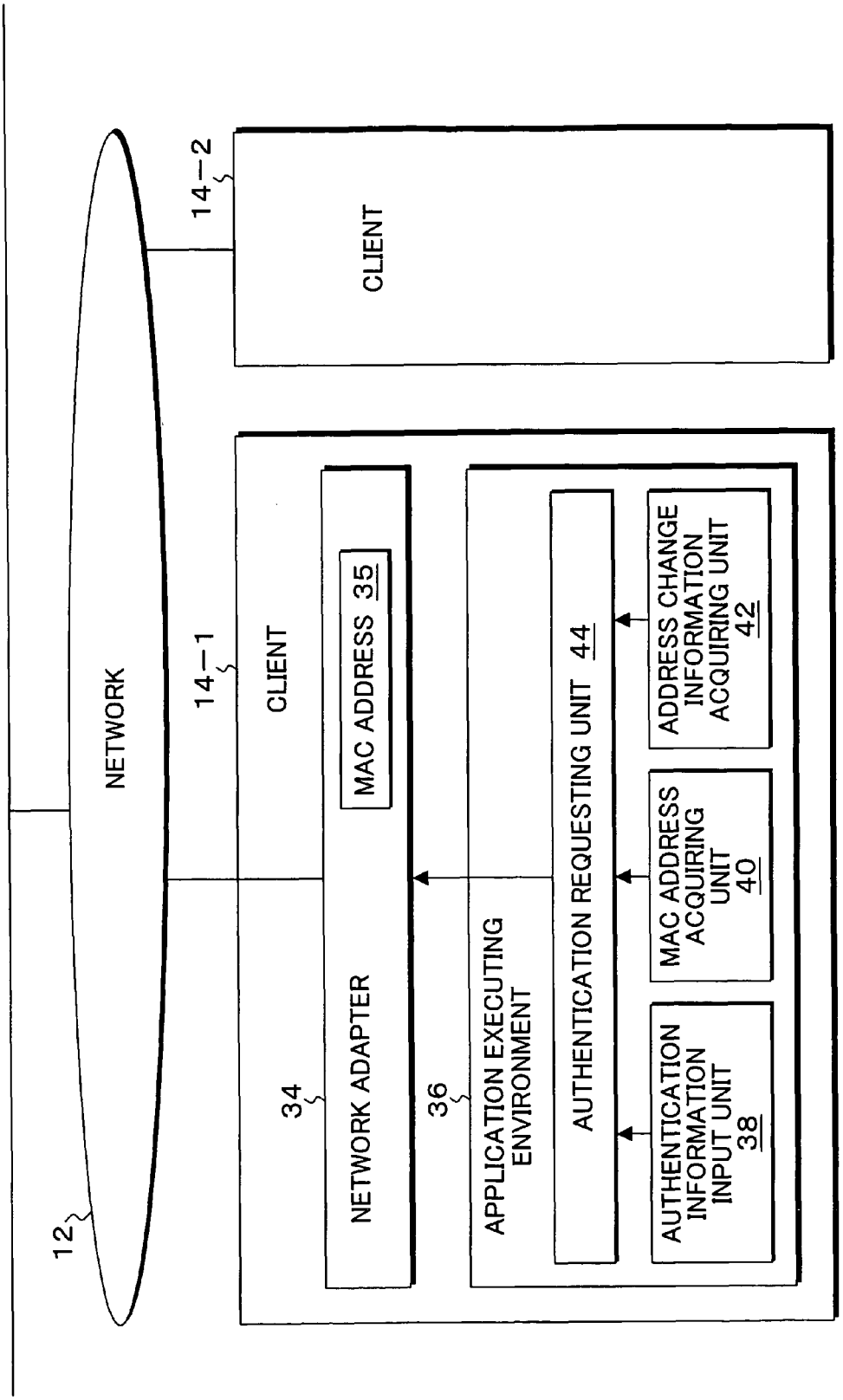

PROGRAM, CLIENT AUTHENTICATION REQUESTING METHOD, SERVER AUTHENTICATION REQUEST PROCESSING METHOD, CLIENT AND SERVER

This application is a priority based on prior application No. JP 2005-086253, filed Mar. 24, 2005, in Japan.

BACKGROUND OF THE INVENTION

1. Field of the Invention

The present invention relates to a program executed in a client and a server for use of services provided by the server, a client authentication requesting method, a server authentication request processing method, the client and the server. More particularly, the invention relates to a program for specifying a user and a client to be used by a user, and allowing supply of services, a client authentication requesting method, a server authentication request processing method, the client and the server.

2. Description of the Related Art

In an electronic service system for services such as ASP service provided by a server, it is the conventional practice to issue a user ID and a password as authentication information through user registration, collating the user ID and the password from the client reported by the user as expressed in the service use request with the registered ID and the password, and allowing use of services when collation shows an agreement.

In such an electronic service system, so that the employee of an enterprise using the system, responsible for its management can watch information necessary for management of the status of system utilization by users, access management is performed by allowing access by the use of terminal information unique to the client with a view to specifying the client used in addition to the ID and the password of the responsible personnel.

This is an access management method of comparing client's unique terminal information registered in advance in the system with the unique terminal information sampled from the client upon use by the user, and if there is an agreement, the user is deemed to be a proper user.

Pieces of client's unique terminal information applicable in this case include an MAC address which is an ID No. unique to NICC (Network Interface Card), a serial No. of the hard disk, a serial No. of CPU, a product No. which falls under information regarding software and various other pieces of information. Among others, the MAC address of the network adapter (NIC) provided in the client is the most widely utilized.

This is because MAC addresses of the network adapters are uniquely allocated so as to avoid duplication for the necessity in communication, and a client terminal using the system via the network is always provided with a network adapter.

In this regard, reference is made to Japanese Unexamined Patent Application Publication No. 2001-358926.

SUMMARY OF THE INVENTION

However, some network adapters can change the MAC address in a software manner, and an improper user may access the system by giving false evidence of MAC address, thus causing a security problem.

For example, when a responsible person having so far accessed the system by the use of an MAC address by means of a special client retires, he (she) may easily enter into the system by previously acquiring the MAC address of the special client for an illegal purpose, and changing the MAC address of another external terminal. Even by intensifying security so as to allow only a particular client to access the system by the use of the MAC address, such a security may easily be broken.

It is an object of the present invention to provide a program with an enhanced security for a client and a server against illegal use of the MAC address, an authentication requesting method of a client, a server authentication request processing method, a client and a server.

The present invention provides a program to be executed by a computer composing a client. The program of the present invention causes a computer composing the client to execute:

an authentication information input step which receives authentication information entered by the user;

an MAC address acquiring step which acquires the MAC address of the network adapter;

an address change information acquiring step which acquires address change information as to whether or not the MAC address has been changed; and an authentication requesting step which requests authentication by transmitting the MAC address and the address change information to the server.

The present invention provides a program to be executed by a computer composing a server. The program of the present invention causes a computer composing the server to execute:

a registering step which registers the authentication information of the user and the MAC address of the client used by the user;

an authentication request receiving step which receives an authentication request including user authentication information from the client, the MAC address and address change information as to whether or not the MAC address has been changed; and an authentication responding step which, when the authentication information and the MAC address agree with the details of registration, and if non-change of the MAC address is recognized from the address change information, issues an access permit in response thereto, and if a change in the MAC address is recognized from the address change information, issues an access refusal in response thereto.

When the authentication information and the MAC address agree with the details of registration in the authentication responding step, and if a change in the MAC address is recognized from the address change information, the program to be executed by the computer composing the server may inform the system manager of the fact and issue an access permit or a refusal in response thereto on the basis of system manager's instruction.

The present invention provides an authentication requesting method of the client. The client authentication requesting method of the present invention causes a computer composing the client to execute:

an authentication information input step which receives authentication information entered by the user;

an MAC address acquiring step which acquires the MAC address of the network adapter;

an address change information acquiring step which acquires address change information as to whether or not the MAC address has been changed; and an authentication requesting step which requests authentication by transmitting the MAC address and the address change information to the server.

The present invention provides a server authentication request processing method. The server authentication request processing method of the present invention causes a computer composing the server to execute:

a registering step which registers the authentication information of the user and the MAC address of the client used by the user;

an authentication request receiving step which receives an authentication request including user authentication information from the client, the MAC address and address change information as to whether or not the MAC address has been changed; and an authentication responding step which, when the authentication information and the MAC address agree with the details of registration, and if non-change of the MAC address is recognized from the address change information, issues an access permit in response thereto, and if a change in the MAC address is recognized from the address change information, issues an access refusal in response thereto.

With regard to the server authentication request processing method, in the authentication responding step, when the authentication information and the MAC address agree with the details of registration, and if a change in the MAC address is recognized from the address change information, the fact may be informed to the system manager, and an access permit or a refusal may be issued in response thereto on the basis of system manager's instruction.

The present invention provides a client. The client of the present invention comprises an authentication information input unit receives the authentication information entered by a user, an MAC address acquiring unit which acquires the MAC address of the network adapter, an address change information acquiring unit which acquires the address change information as to whether or not the MAC address has been changed, and an authentication requesting unit which requests authentication by transmitting the authentication information, the MAC address and the address change information to the server.

The present invention provides a server. The server of the present invention comprises a registering unit which registers authentication information of a user and an MAC address of the client used by the user; an authentication request receiving unit which receives an authentication request containing user authentication information from the client, an MAC address, and address change information as to whether or not the MAC address has been changed; and an authentication responding unit which, when the authentication information and the MAC address agree with the details of registration, and if non-change of the MAC address is recognized from the address change information, issues an access permit in response thereto, and if a change in the MAC address is recognized from the address change information, issues an access refusal in response thereto.

When the authentication information and the MAC address agree with the details of registration in the authentication responding unit, and if a change in the MAC address is recognized from the address change information, the server of the present invention may inform the system manager of the fact and may issue an access permit or a refusal on the basis of system manager's instruction.

According to the present invention, when changing operation of the MAC address is performed in the client, address change information showing the change in MAC address is transmitted to the server in addition to the MAC address upon requesting authentication. On the server side, therefore, even when the MAC address is in agreement, failure of authentication may be caused to refuse the use of the service if a change in the MAC address is recognized. In a system in which the client terminal is authenticated by means of the MAC address, therefore, occurrence of illegal access through camouflage of the MAC address can be reliably prevented.

Since the program acquiring the address change information showing a change in MAC address and informing of the same is executed on the client, it is not always impossible to alter the program, like the MAC address, and to use a false address change information as being valid without a change in the MAC address. While it is easy to change the MAC address by use of properties of the network adapter, it is not easy to change the program. If there is a change in MAC address, therefore, it is possible to reliably inform the server of this change to refuse access.

When an MAC address unique to the network adapter is different from that registered in the system for repairing or replacement of the network adapter, thus preventing access, even a proper user may probably change the MAC address unavoidably. When a change in MAC address is recognized, therefore, flexible management of the system is ensured by informing the system manager of the possibility of an illegal use, and issuing an access permit or an access refusal in response to manager's instruction.

The above and other objects, features, and advantages of the present invention will become more apparent from the following detailed description with reference to the drawings.

BRIEF DESCRIPTION OF THE DRAWINGS

FIG. 3 is a descriptive view of the change screen of the MAC address in the client shown in FIGS. 1A and 1B;

FIGS. 4A and 4B are descriptive views of the registry editor screen before changing the MAC address;

FIGS. 5A and 5B are descriptive views of the registry editor screen after changing the MAC address;

FIGS. 8A and 8B are block diagrams of another embodiment of the present invention in which an inquiry is made to the manager's device.

DETAILED DESCRIPTION OF THE PREFERRED EMBODIMENTS

Figure 1A:
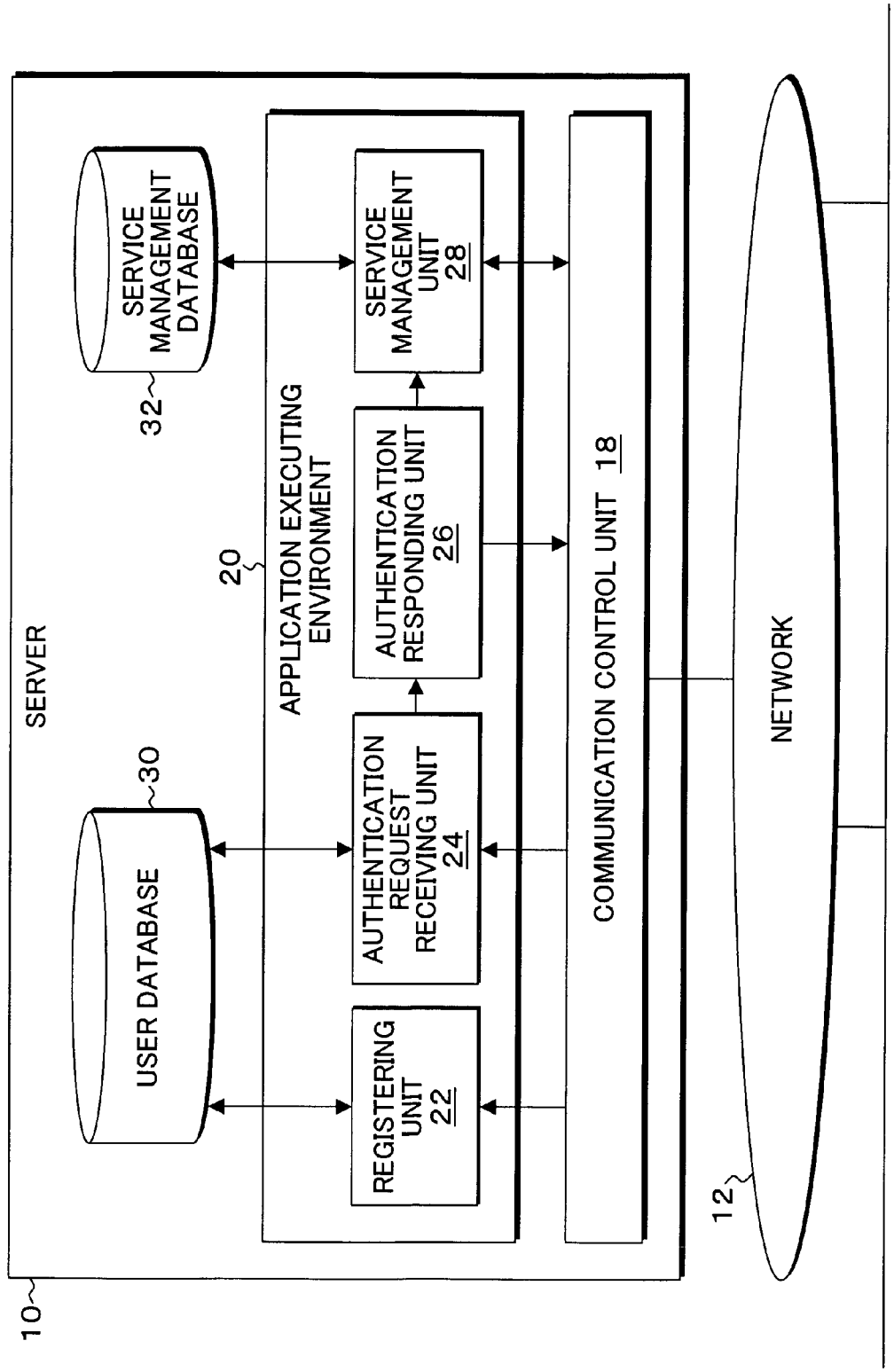
FIGS. 1A and 1B are block diagrams of the functional configuration of the server and the client to which the present invention is applied.
Figure 1B:
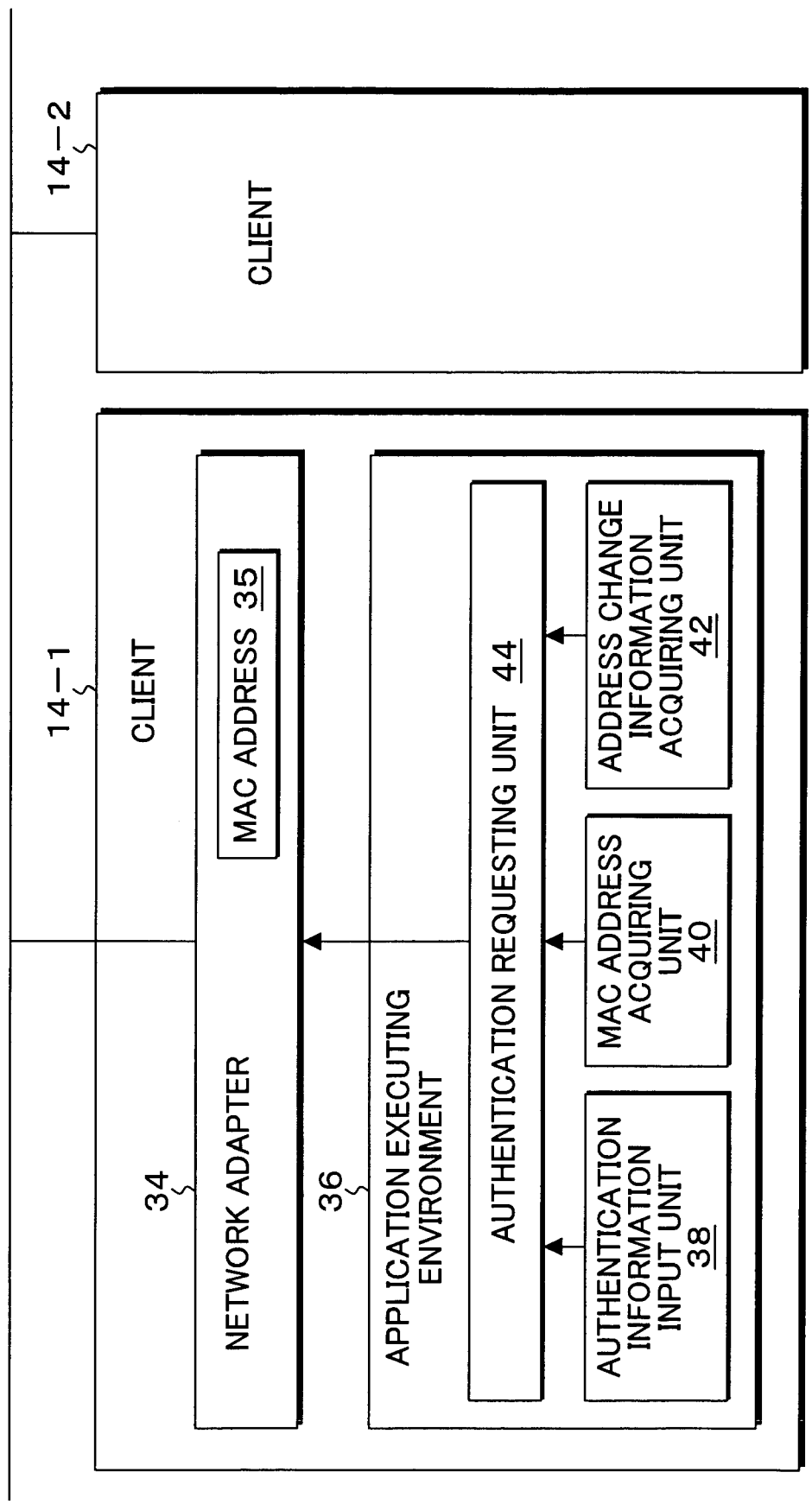

FIGS. 1A and 1B are block diagrams of the functional configuration of the server and the client to which the present invention is applicable. In FIGS. 1A and 1B, the server 10 providing an ASP service or the like is connected to a network 12, and the clients 14-1 and 14-2 accessing the server 10 are connected to the network 12. The clients 14-1 and 14-2 access the server 10 by using user's ID and password as well as an MA address, and for example by a responsible person of an enterprise managing services of the server 10 as his (her) special device. A communication control unit 18 and an application executing environment 20 are provided in the server 10. A registration unit 22, an authentication request receiving unit 24, an authentication responding unit 26 and a service management unit 28 are provided in the application executing environment 20. A user database 30 and a service management database 32 are provided for the application executing environment 20. On the other hand, as typically shown by the client 14-1, a network adapter 34 and an application executing environment 36 as provided in the clients 14-1 and 14-2. The network adapter 34 has a unique MAC address 35. The application executing environment 36 has an authentication information input unit 38, an MAC address acquiring unit 40, an address change information acquiring unit 42 and an authentication requesting unit 44. The functions provided in the application executing environment 36 of the client 14-1 will now be described. The authentication information input unit 38 receives authentication information comprising an ID and a password entered by the user upon using management service of the server 10. The MAC address acquiring unit 40 acquires the MAC address 35 of the network adapter 34. The address change information acquiring unit 42 acquires address change information as to whether or not the MAC address 35 of the network adapter 34 has been changed. The authentication requesting unit 44 transmits the authentication information received by the authentication information input unit 38, the MAC address acquired by the MAC address acquiring unit 40, and the address change information acquired by the address change information acquiring unit 42 to the server 10, and requests an authentication for utilizing management service. The functions provided in the application executing environment 20 of the server 10 will now be described. The registering unit 22 registers users who receive management services provided by the server 10 in the user database 30. For the clients 14-1 and 14-2 which use the MAC address in addition to the ID and the password, in this case, the MAC address is simultaneously registered apart from the authentication information of the ID and the password. The authentication request receiving unit 24 receives an authentication request including user's authentication information, the MAC address, and address change information as to whether or not the MAC address has been changed from the client 14. The authentication responding unit 26 comparatively collates the user authentication information and the MAC address received by the authentication request receiving unit 24 with the details registered in the user database 30, and when the authentication information and the MAC address are in agreement with the registration, determines from the address change information whether the MAC address is the one unique to the client or has been changed. When the MAC address is unique to the client, the unit 26 returns an access permit to the client 14, to allow the client 14 to use the management service. When a change in the MAC address is recognized, the unit 26 issues an access refusal, thus completing the processing.

Figure 2:
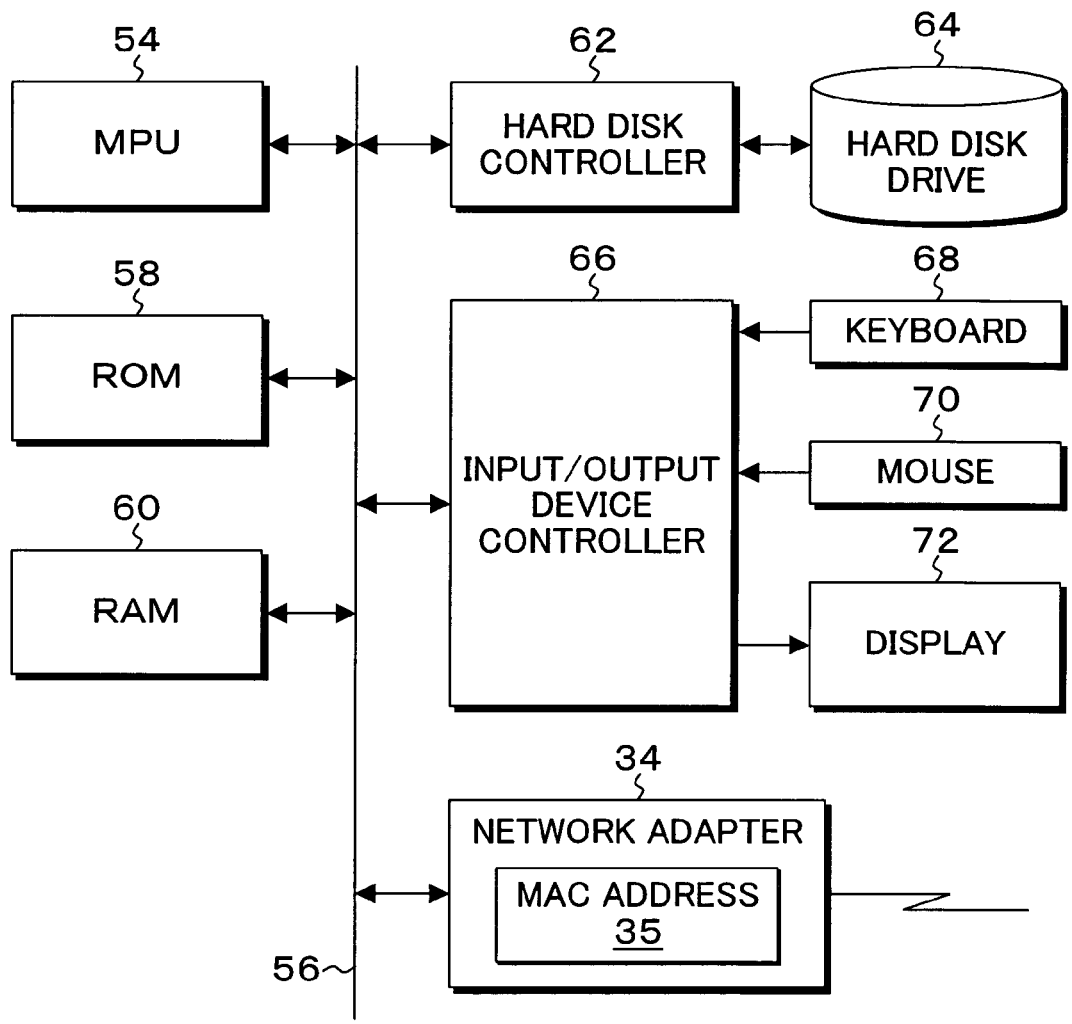
FIG. 2 is a block diagram of the hardware environment of a computer used for the server and the client shown in FIGS. 1A and 1B.

FIG. 2 is a block diagram of the hardware environment of the computer used for the server 10 and the client 14 shown in FIGS. 1A and 1B. In FIG. 2, an ROM 58, an RAM 60, a hard disk controller 62 for accessing the hard disk drive 64, an input/output device controller 66 connected to a keyboard 68, a mouse 70, a display 72, and a network adapter 34 having an MAC address 35 are connected to a bus 56 of an MPU 54. The hard disk drive 64 loads a server program for the server 10, and a client program for the clients 14-1 and 14-2. Upon activating the computer, it calls a program required by the hard disk controller 62 from the hard disk drive 64, deploys the same on the RAM 60, and causes the MPU 54 to execute the same. Referring again to FIGS. 1A and 1B, concrete examples of the MAC address acquiring unit 40 and the address change information acquiring unit 42 provided in the client 114-1 will be described in detail with a computer using the Microsoft Windows R as an OS as an example. The MAC address is available generally by calling the function Netbios of Windows R SDK (software development kit). For the address change information showing whether or not the acquired MAC address is unique to the network adapter 34, for example, the following procedure is commonly used in a computer using Microsoft Windows 2000® or windows XP® as an OS:

(1) Acquiring the handle for the following registry key by using the function RegOpenKeyEx of the Windows ® SDK:

HKEY_LOCAL_MACHINE_SYSTEM ¥Current-ControlSetControl ¥Class¥ {4D36E972-E325-11CE-BFC1-08002 BE10318} ¥80000 ¥;

(2) Then, acquiring a list of data names under the registry by using the function RegEnumValue;

(3) When a data "NetworkAddress" exists in the acquired data name list, transmitting, for example, a parameter "NAEXIST=1" and the value thereof as the address change information to the server 10 via the authentication requesting unit 44;

(4) When a data "NetworkAddress" does not exist in the data name list without a change in MAC address, transmitting a parameter "NAEXXIST=0" and the value thereof to the server 10 via the authentication requesting unit 44.

FIG. 3 is a descriptive view of the MAC address change screen in the client 140-1 shown in FIGS. 1A and 1B. In FIG. 3, the MAC address change screen 76 represents a computer using Microsoft Windows 2000® or Window XP® as an OS as an example: by opening "Driver" from among the "Properties of management", the dialog of Properties (P) us displayed, and there is found, among others, an MAC address setting menu 78 "Locally Administered Address" for changing the network address. Double-checking this MAC address setting menu 78 results in display of an address input frame 80 to the right thereof together with a radio button. By clicking the radio button, entering, for example, "123456789ABC" as a change value of the MAC address into the address input frame 80, and clicking an OK button at the bottom, the MAC address of the network adapter can be changed into the entered MAC address "123456789ABC".

Figure 4A:
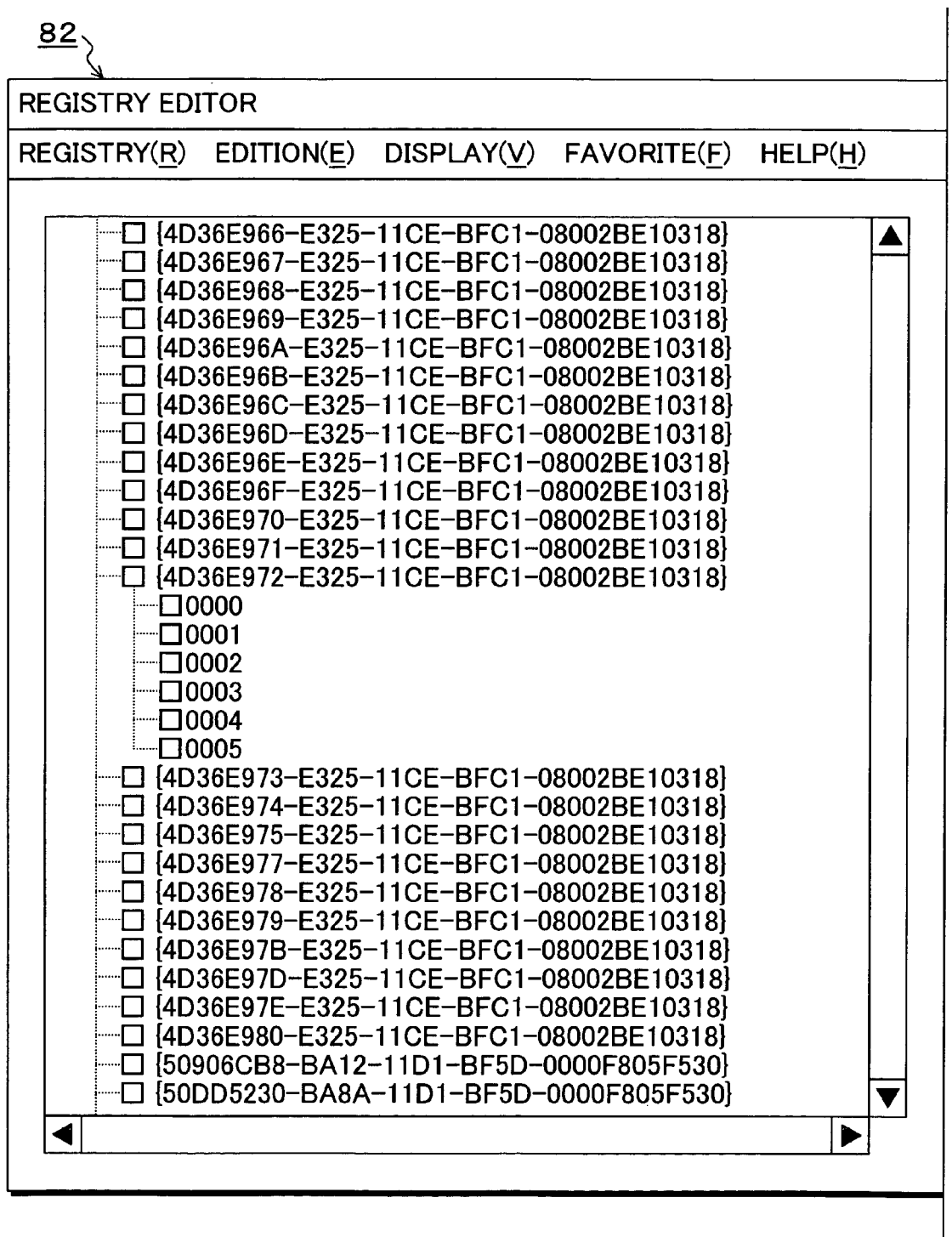

FIGS. 4A and 4B illustrate a registry editor screen 82 prior to changing the MAC address, having a registry displayed to the left, and a data name list 84 displayed to the right. In this registry editor screen 82, since the MAC address of the network adapter has not been changed, the data "NetworkAddress" showing the MAC address after change is non-existent in the data name list 84.

Figure 5A:
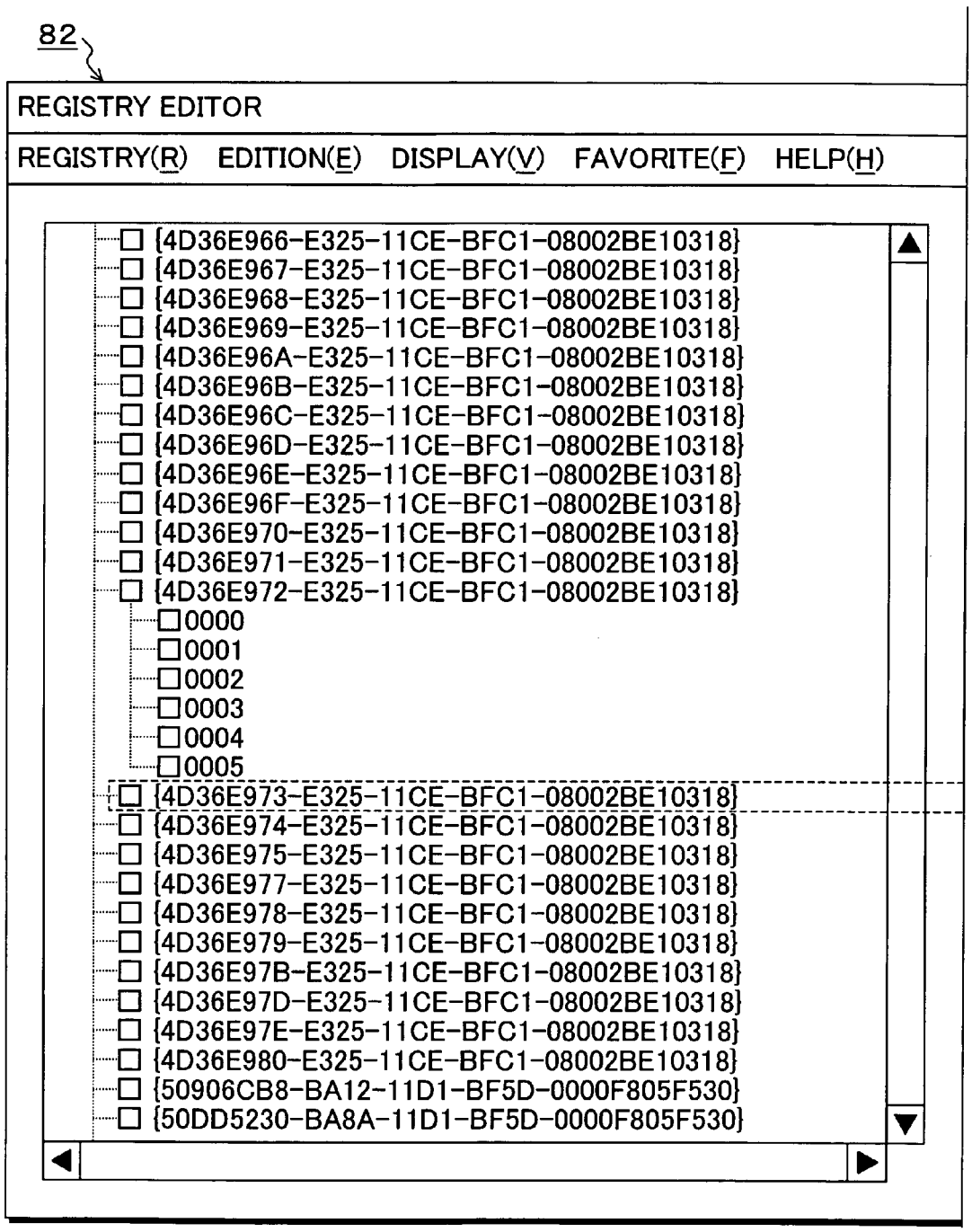

FIGS. 5A and 5B illustrate the registry editor screen 82 after changing the MAC address into "123456789ABC" by using the MAC address changing screen 76 shown in FIG. 3. In this registry editor screen 82, the MAC address changing information 90 is added into the data name list 84, and this MAC address change information 90 contains the data "NetworkAddress" indicating that the MAC address has been changed. The data has details "123456789ABC" which is the MAC address after change.

Figure 6:
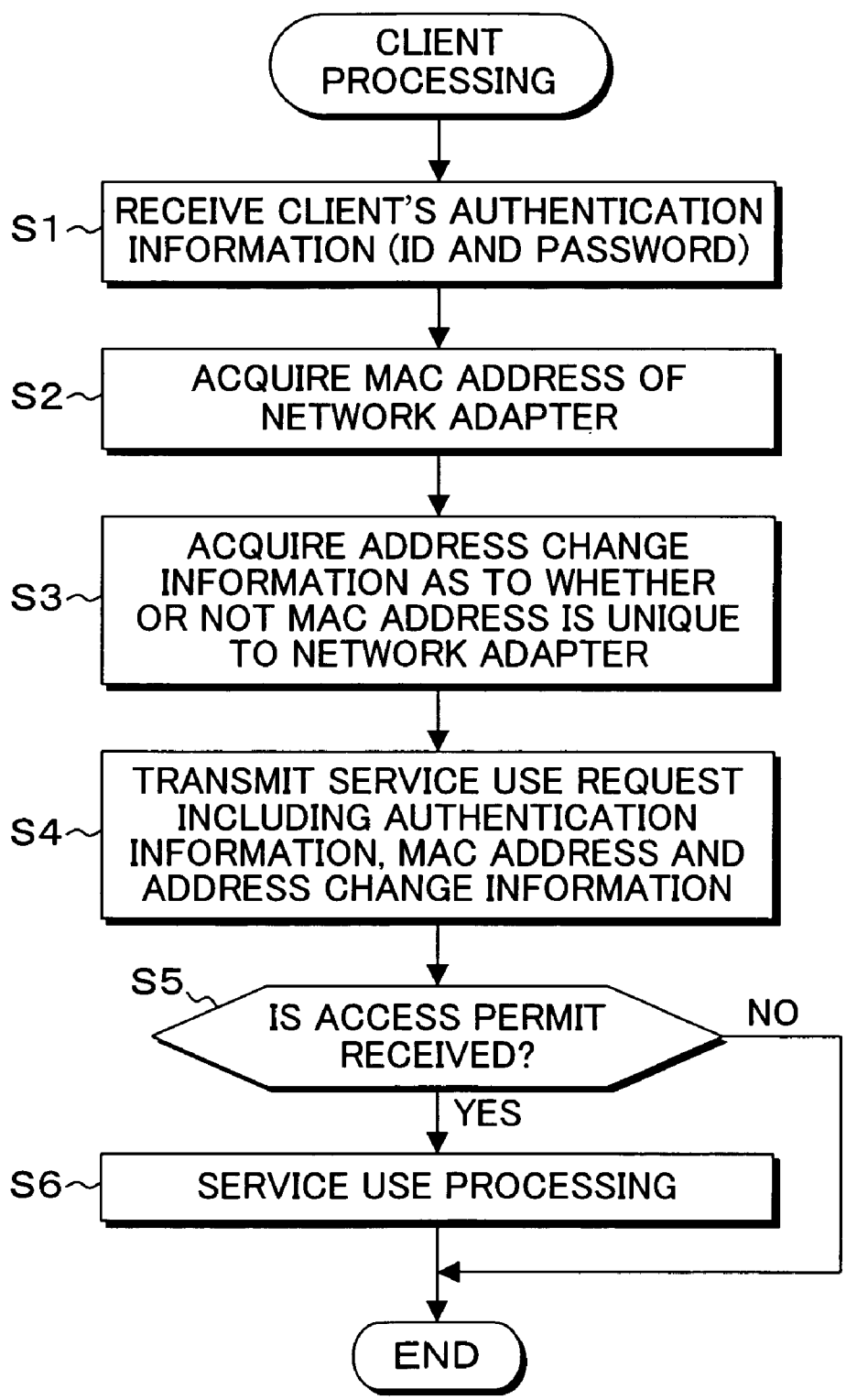
FIG. 6 is a flowchart of client processing shown in FIGS. 1A and 1B.

FIG. 6 is a flowchart showing the processing procedure of the client 14-1 shown in FIGS. 1A and 1B. In FIG. 6, after receiving the authentication information comprising the user's ID and password in step S1, the client processing obtains the MAC address 35 of the network adapter 34 in step S2. Then in step S3, the address change information as to whether or not the MAC address 35 is unique to the network adapter 34 is acquired. Then in step S4, a service use request (authentication request) including the authentication information, the MAC address and the address change information is transmitted to the screen 10. When an access permit is received in step S5 in response to this service use request, processing is started for service use processing of step S6. If access is refused, processing would be completed without starting service use.

Figure 7:
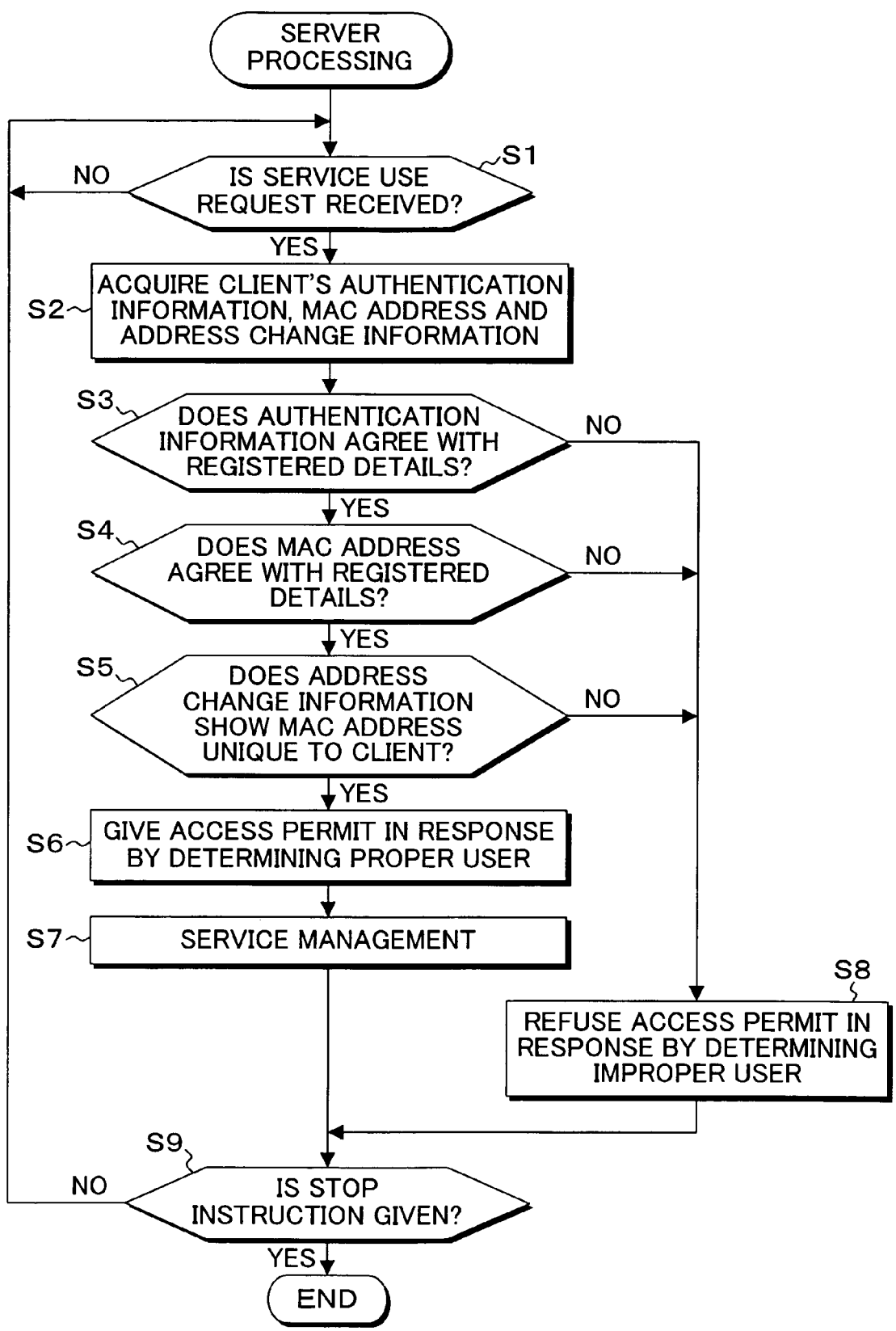
FIG. 7 is a flowchart of server processing shown in FIGS. 1A and 1B.

FIG. 7 is a flowchart of the processing procedure in the server 10 shown in FIGS. 1A and 1B. In FIG. 7, the server processing comprises checking of receiving of a service use request from the client in step S1. Upon receipt of the service use request, the process advances to step S2, in which the authentication information, the MAC address and the address change information sent from the client 14-1 are acquired. Then in step S3, it is determined whether or not the authentication information comprising an ID and a password is in agreement with the details of registration in the user database. If in agreement, it is checked whether or not the MAC address agrees with the registered details in the user database 30 in step S4. If the MAC address agrees with the details of registration, the process goes to step S5, and it is checked whether or not the address change information represents the MAC address unique to the client. When the address change information is, for example, "NAEXIST=0", the fact that this is an MAC address unique to the client is recognized, and the process advances to step S6. The user is determined to be a proper user and an access permit is issued in response to this. In step S7, service management is performed in response to the request from the client. On the other hand, when the address change information is "NAEXIIST=1" in step S5, this is recognized to be a changed MAC address, not an MAC address unique to the client, and then in step S8, an access refusal is issued in response. These processing steps S1 to S8 are repeated until a stop instruction is received in step S9. As a result of the client processing of FIG. 6 and the server processing of FIG. 7, for example, when the responsible person using the client 14-1 in charge of management of the server 10 in the system shown in FIGS. 1A and 1B go out for retirement or the like, and even if he (she) carries out the authentication information containing the ID and the password of the client 14-1 as well as the MAC address 35 of the network adapter 34 and tries to illegally access the server 10 by changing the MAC address of the network adapter 46 in another client such as the client 14-2 into the MAC address 35 of the client 14-1, the change in the MAC address unique to the network adapter of the client is recognized in the server 10, resulting in an access refusal. It is thus possible to reliably prevent an illegal access through camouflage of the MAC address.

FIG. 8 is a block diagram of another embodiment of the present invention in which, upon recognizing a change in MAC address in a service use request from a client, an inquiry is made to manager's device. In FIG. 8, the server 10 and the clients 14-1 and 14-2 have the same configurations as in the embodiment shown in FIGS. 1A and 1B, except however that a further manager's device 92 is provided on the server 10 side, connected to a LAN 9.

In this embodiment shown in FIG. 8, for the authentication information, the MAC address and the address change information obtained at the authentication request receiving unit 24 in response to a service use request from the client in the authentication responding unit 26 of the server 10, when the authentication information and the MAC address are in agreement, but a change in MAC address is recognized from the address change information, the access refusal is not immediately issued in response to the client, but the possibility of illegal use through a change in MAC address is notified to the manager's device via the LAN 94 and an instruction from the manager is waited for. In addition to the case of an illegal use of management services provided by the server 10, the MAC address is changed on the clients 14-1 and 14-2 side when a trouble in the network adapter of the client leads to a change in the MAC address through replacement by a new network adapter, and an access cannot be made to the server 10 in this state. An access is made sometimes in this case by changing the MAC address into that of the network adapter before the occurrence of the trouble. In such an event, the user informs the manager of the management service provided by the server 10 in advance of the change in the MAC address and obtains his (her) permit. Therefore, the manager using a manager's device 92, upon receipt of an inquiry about possibility of an illegal use through a change in the MAC address from the server 10, and if it is the change in MAC address from the user notified in advance, instructs issuance of an access permit since this is a normal access. Upon receipt of this permit, the authentication responding unit 26 of the server 10 issues an access permit to the client. On the other hand, in the case of a service use request from a client not requesting a change permit of the MAC address on the manager's device 92 side, the manager's device 92 issues in response an access refusal because of the high probability of an illegal use. Upon receipt thereof, the authentication responding unit 26 of the server 10 issues in response an access refusal to the client. By making an inquiry to the manager's device upon recognition of a change in the MAC address, and issuing an access permit or an access refusal in accordance with an instruction of the manager, it is possible to achieve a more flexible management of the system while taking into account replacement and repairing required as a result of a trouble in the network adapter in the client.

Figure 9A:
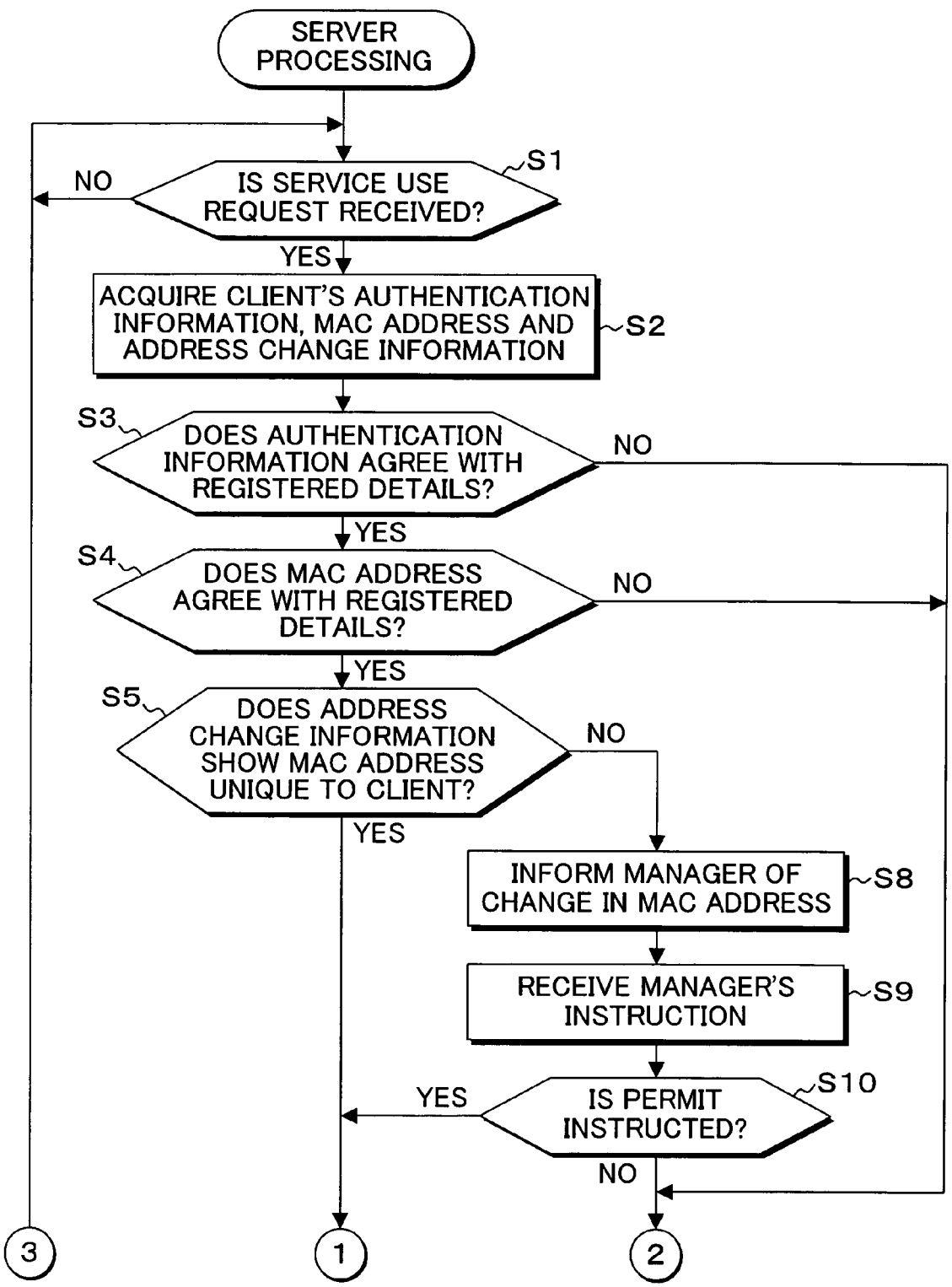
FIGS. 9A and 9B are flowcharts of server processing shown in FIGS. 8A and 8B.
Figure 9B:
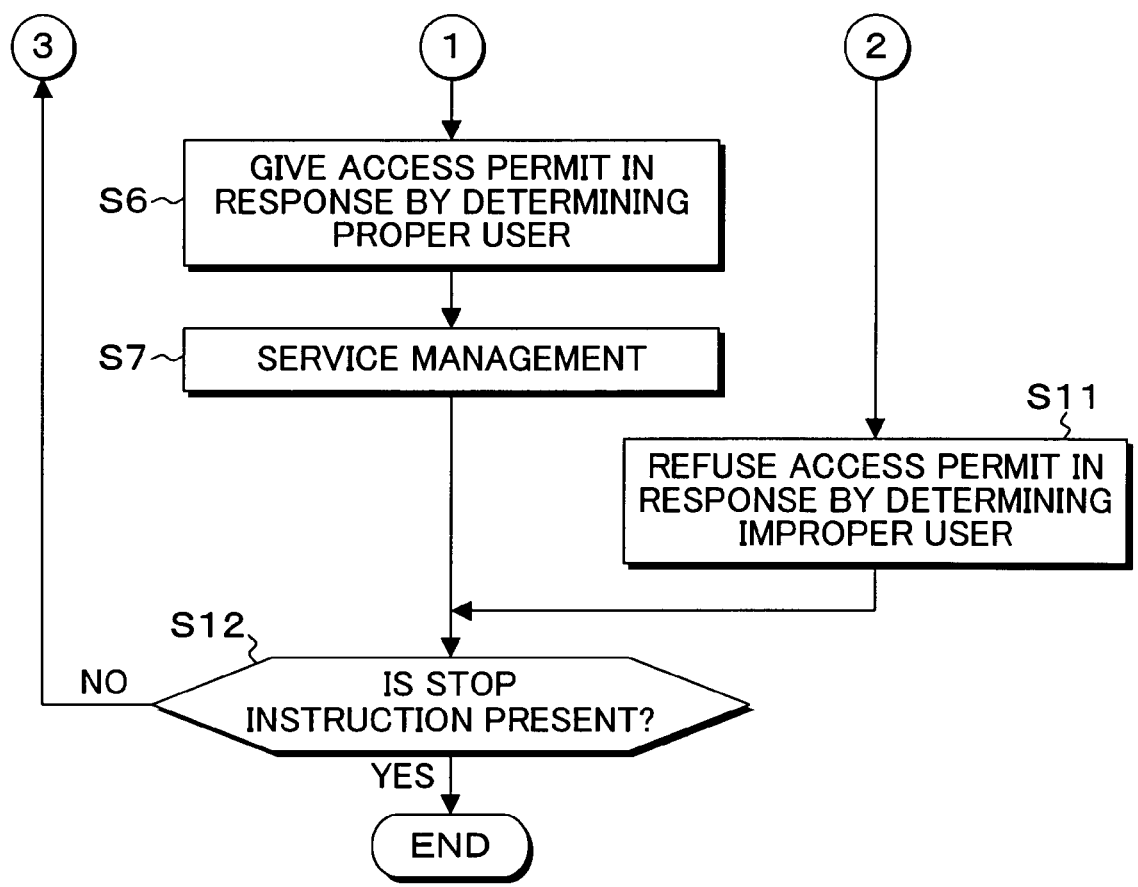

FIGS. 9A and 9B are flowcharts of the server processing shown in FIG. 8. In FIGS. 9A and 9B, the server processing comprises receiving a service use request from the client in step S1; acquiring authentication information, the MAC address and the address change information of the client in step S2; if the authentication information agrees with the details of registration in step S3, comparing the MAC address with the details of registration in step S4; and if they are in agreement, it is checked if the address change information shows an MAC address unique to the client or not in step S5. If it is an MAC address unique to the client, the user is determined to be a proper user and an access permit is issued in step S6. Service management is started in step S7. On the other hand, when a change in the MAC address is recognized, the MAC address not being an MAC address unique to the client from the address change information in step S5, the recognition of the change in the MAC address is informed to the manager's device 92 in step S8. A manager's instruction is received in step S9. If an access permit is instructed in step S10, an access permit is issued in response in step S6, and if an access refusal is instructed, the user is determined to try to be an illegal user in step S11, and an access refusal is issued in response. The present invention provides the program used for the server 10 and the clients 14-1 and 14-2 shown in FIGS. 1 and 8. For the clients, this program has contents as shown in the flowchart of FIG. 6, and for the server, it has contents as shown in the flowchart of FIG. 7 or 9. In order to use the management service provided by the server 10, the clients 14-1 and 14-2 must have a program having contents as shown in the flowchart of FIGS. 5A and 5B installed therein. Installation of the program necessary for the present invention in the clients 14-1 and 14-2 is accomplished either by downloading based on a response of permit resulting from application for the server 10, or, an installation using a program package recorded on a computer-readable medium mailed separately.

The present invention includes appropriate variations without impairing objects and advantages thereof, and is not limited by numerical values shown in the above-mentioned embodiments.

What is claimed is:

1. A computer-readable non-transitory medium, storing a program causing a server machine to execute:
    a registration step which registers a first authentication information of a user and a first MAC address;
    an authentication request receiving step which receives, from a client machine, an authentication request including a second authentication information, a second MAC address, and address change information as to whether or not an original MAC address of the client machine has been changed to the second MAC address; and
    an authentication responding step which, upon determining the second authentication information and the second MAC address are in agreement with the first authentication information and the first MAC address:
    if non-change in the second MAC address is recognized from said address change information, issuing an access permit in response to the authentication request from the client machine, and
    if a change in the second MAC address is recognized from said address change information, informing a system manager of the change in the second MAC address, and issuing an access permit or an access refusal in accordance with an instruction of the system manager to the client machine.

2. A server authentication request processing method allowing a computer comprising a server machine to execute:
    a registration step which registers a first authentication information and a first MAC address;
    an authentication request receiving step which receives, from a client machine, an authentication request including a second authentication information, a second MAC address, and address change information as to whether or not an original MAC address of the client machine has been changed to the second MAC address; and
    an authentication responding step which, upon determining the second authentication information and the second MAC address are in agreement with the first authentication information and the first MAC address:
    if non-change in the first MAC address is recognized from said address change information, issuing an access permit in response to the authentication request from the client machine, and
    if a change in the first MAC address is recognized from said address change information, informing a system manager of the change in the second MAC address, and issuing an access permit or an access refusal in accordance with an instruction of the system manager to the client machine.

3. A server machine comprising:
    a hard disk drive storing a database, the database containing user information; and
    a processing unit including:
    a registration unit which registers authentication information and a first MAC address into the database;
    an authentication request receiving unit which receives, from a client machine, an authentication request including authentication information, a second MAC address, and address change information as to whether or not an original MAC address of the client machine has been changed to the second MAC address; and
    an authentication responding unit which, upon determining the second authentication information and the second MAC address are in agreement with the first authentication information and the first MAC address:
    if non-change in the second MAC address is recognized from said address change information, issuing an access permit in response to the authentication request from the client machine, and
    if a change in the second MAC address is recognized from said address change information, notifying a system manager of the change in the second MAC address and issuing an access permit or an access refusal in accordance with an instruction of the system manager to the client machine.

* * * * *